United States Patent [19]

Allen

[11] Patent Number: 4,949,852
[45] Date of Patent: Aug. 21, 1990

[54] STORAGE RACK SYSTEMS

[75] Inventor: Donald R. Allen, Frenchtown, N.J.

[73] Assignee: Frazier Industrial Company, Long Valley, N.J.

[21] Appl. No.: 406,723

[22] Filed: Sep. 13, 1989

[51] Int. Cl.$^5$ .............................................. A47F 5/00
[52] U.S. Cl. ..................................... 211/151; 414/276
[58] Field of Search ...................... 211/151, 59.2, 162; 414/276

[56] References Cited

U.S. PATENT DOCUMENTS

| 3,465,894 | 9/1969 | Setecka | 211/151 X |
| 4,341,313 | 7/1982 | Doring | 211/151 |
| 4,462,500 | 7/1984 | Konstant et al. | 211/151 |
| 4,613,270 | 9/1986 | Konstant et al. | 211/151 X |
| 4,687,404 | 8/1987 | Seiz et al. | 211/151 X |
| 4,773,546 | 9/1988 | Konstant | 211/151 |

Primary Examiner—Robert W. Gibson, Jr.
Attorney, Agent, or Firm—Joseph W. Molasky & Assocs.

[57] ABSTRACT

Storage rack systems having a plurality of storage bays adapted to store pallet loads of three pallets deep and four pallets deep are disclosed. The three deep system includes a pair of tracks having a double cart assembly movable therealong between a forward position and a back position, the double cart assembly comprising a large cart which rides on the tracks and a small cart carried by and movably mounted on the large cart for movement between a front and rear position. The forward position of the double cart assembly is located at the entry end of the storage bay and the back position of the double cart assembly is located to span two and three pallets deep from the entry end of the storage bay. The four deep system includes a pair of track means having a lower cart and an upper double cart assembly movable therealong between forward and back positions. The forward positions of both the lower cart and the upper double cart assembly are located at the entry end of the storage bay, the back position of the lower cart is located two pallets deep from the entry end of the storage bay, and the back position of the upper cart assembly is located to span three and four pallets deep from the entry end of the storage bay.

15 Claims, 6 Drawing Sheets

FIG. 1
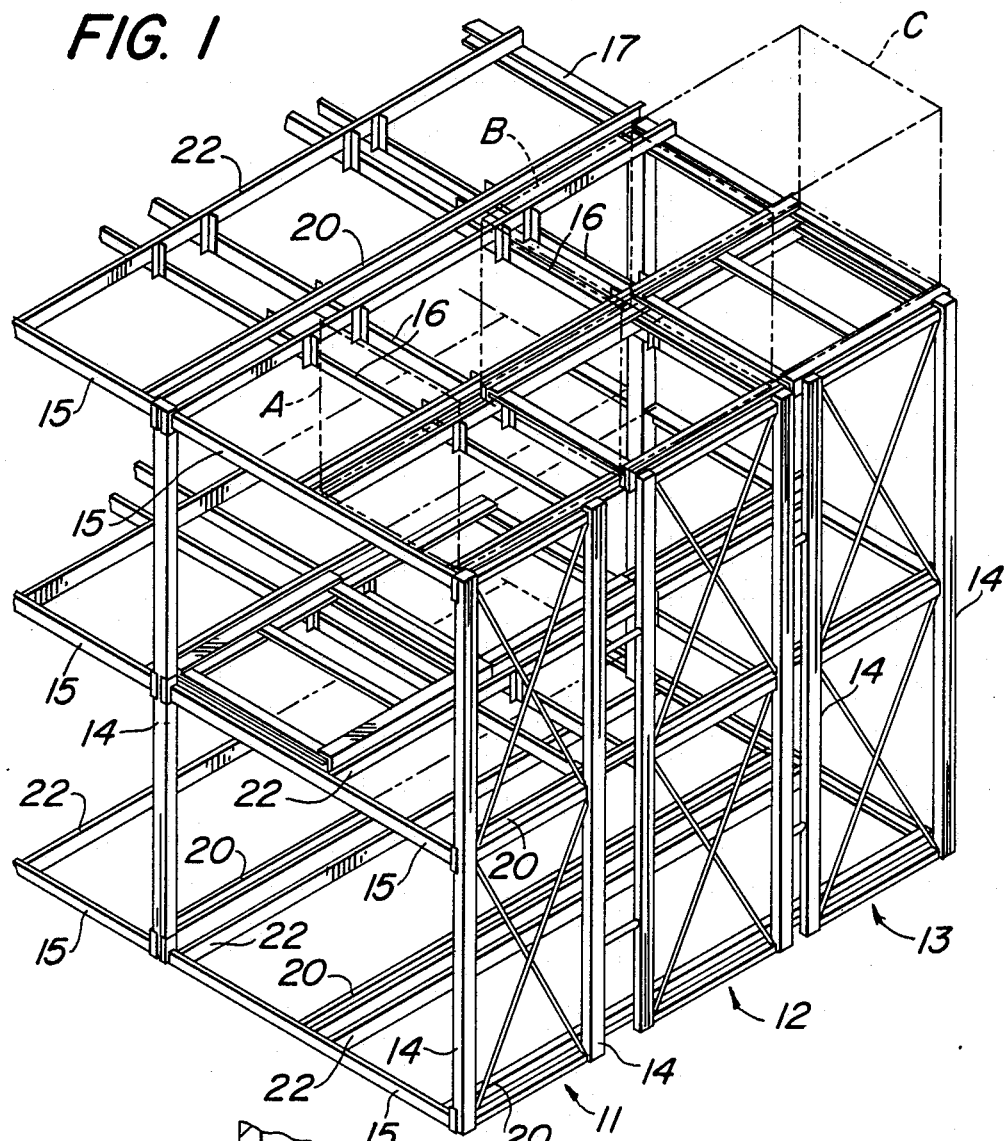
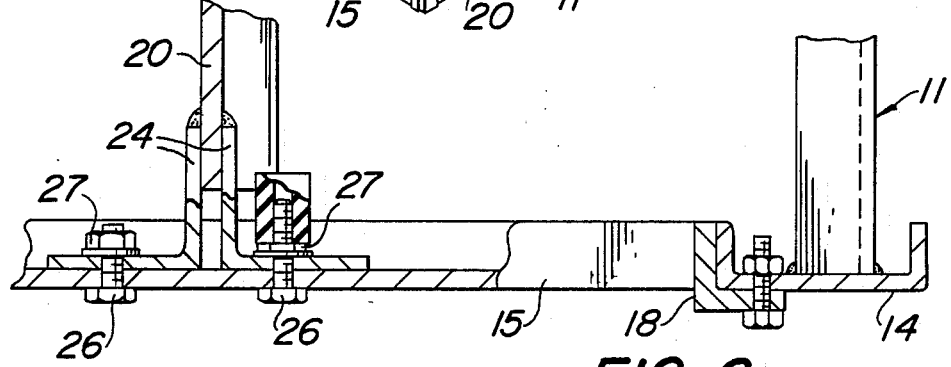
FIG. 6

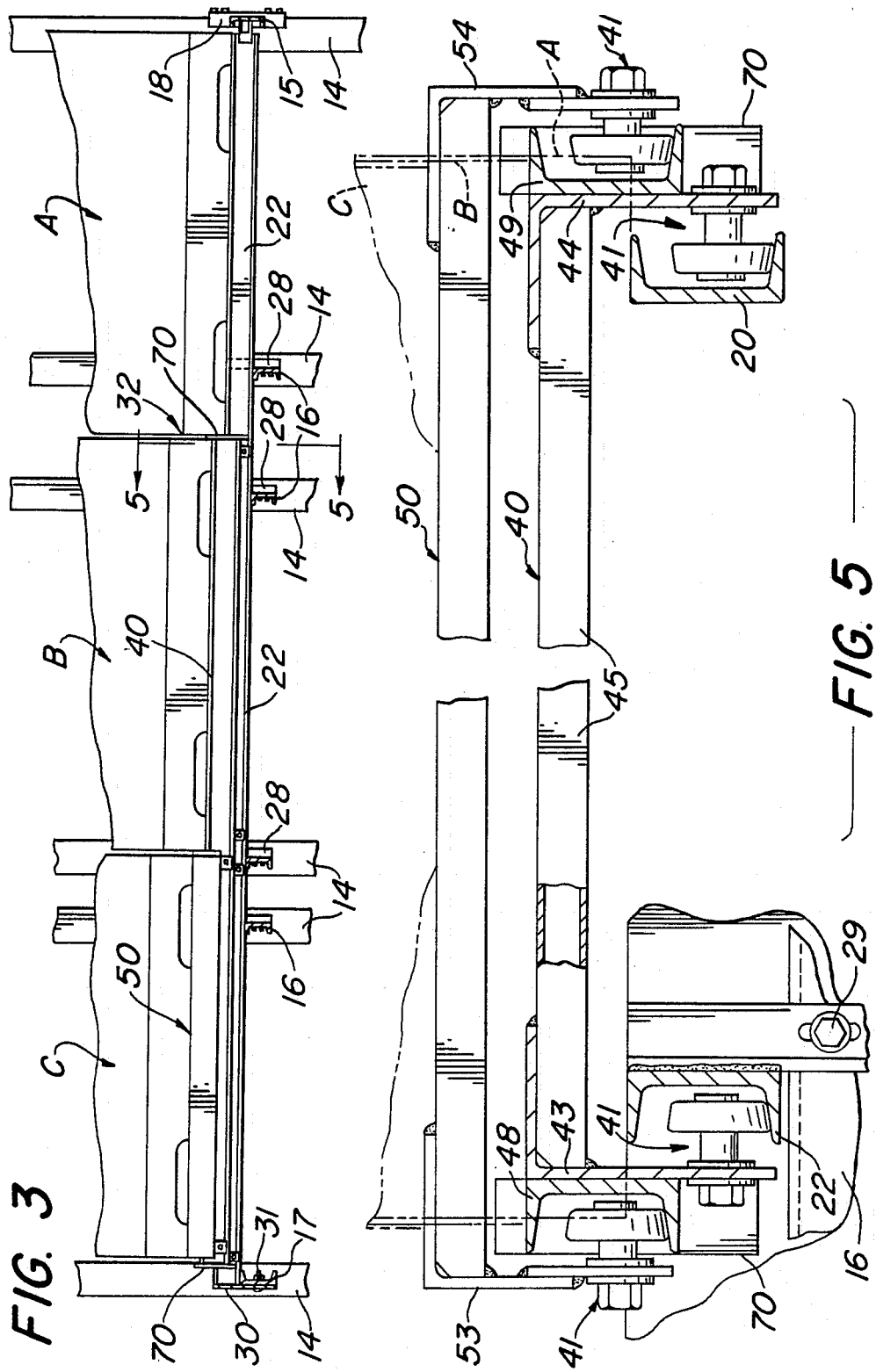

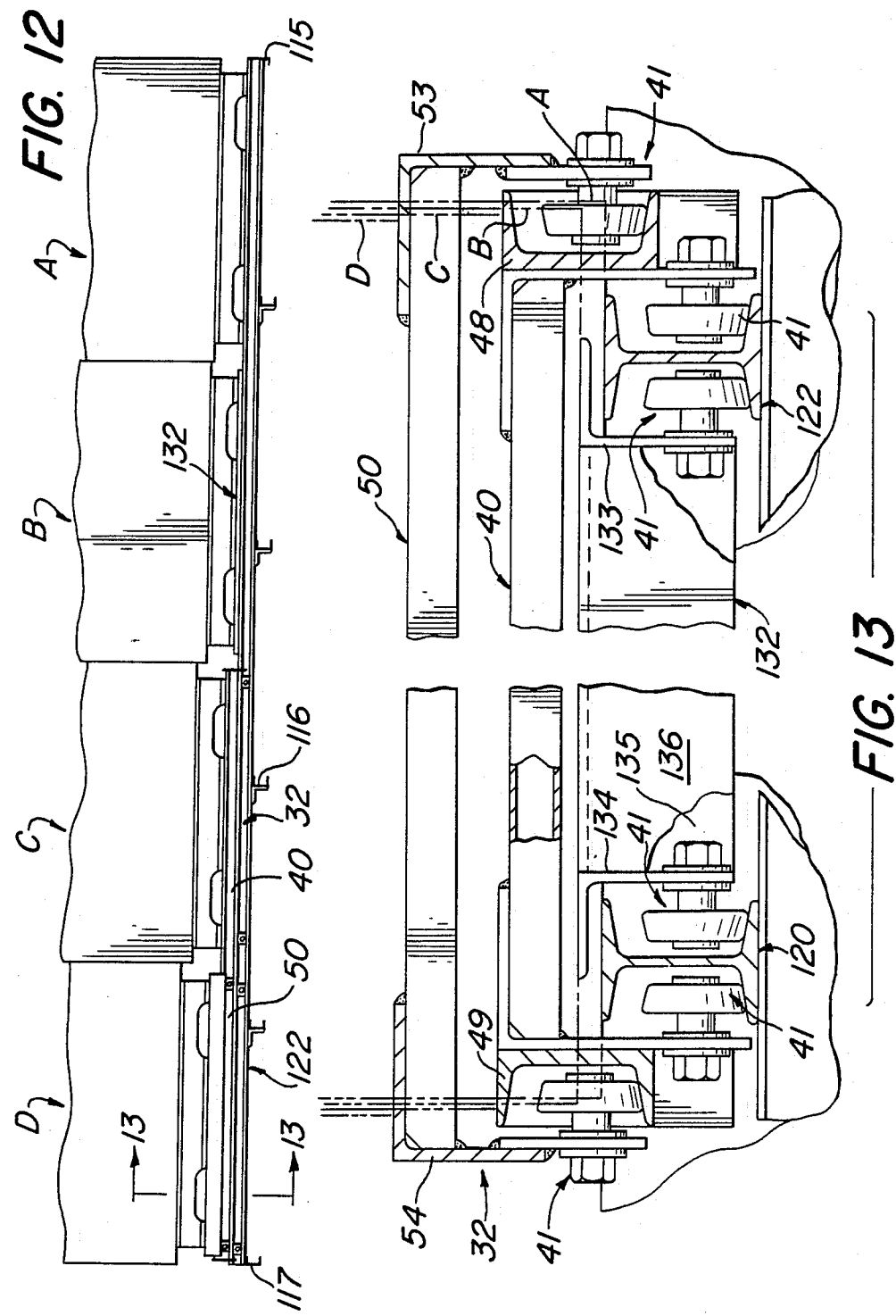

STORAGE RACK SYSTEMS

BACKGROUND OF THE INVENTION

1. Field of the Invention

This invention relates generally to storage rack systems for articles loaded on pallets of the type adapted to be handled by lift trucks, and more particularly, to storage rack systems of the push-back type.

2. Description of the Prior Art

In my co-pending application Ser. No. 233,122, filed Aug. 12, 1988, there is disclosed a storage rack system of the same type disclosed herein, and reference is made to the prior art cited in said prior application.

Typical of the prior art are the storage rack systems shown in U.S. Pat. Nos. 4,341,313 and 4,773,546. Each of these patents discloses a storage rack system comprising a track means wherein two carts, an upper and a lower cart, are mounted for movement therealong to provide for the storage of three pallets deep.

SUMMARY OF THE INVENTION

It is the general object of the invention to provide a storage rack system for storing pallet loads of three pallets deep and four pallets deep comprising a construction that involves a minimum cost in both manufacture and installation.

Another object of the invention is to provide a storage rack system of the indicated type which employs all structural components comprising commercially available hot rolled structural steel components and forms.

Another object of the invention is to provide storage rack systems of the indicated type which involve an improvement over the storage rack system disclosed in my prior patent application, Ser. No. 233,122.

Briefly stated, the storage rack system in accordance with the invention comprises a double cart assembly comprising a large cart adapted to ride along the track means of the storage rack and a small cart carried by and mounted for movement on the large cart between front and rear positions. In the case of the four deep system, there is provided an additional lower cart for storing a pallet load at the two deep position.

An advantage of the storage rack systems of the invention is that it is possible to use a simple and inexpensive type of track means, as for example in the case of the three deep system it is possible to use a single pair of C-channel type of tracks. Thus, as compared with the three deep systems of the prior art, a complete set of tracks is eliminated. Moreover, the design of the invention eliminates the number of connections that are required.

DETAILED DESCRIPTION OF THE DRAWINGS

FIG. 1 is a perspective view showing part of a storage rack system employing the push-back rack construction in accordance with the invention for the storage of three pallets deep.

FIG. 3 is a sectional view taken generally on lines 3—3 of FIG. 2.

FIG. 5 is a sectional view taken generally on line 5—5 of FIG. 3.

FIG. 6 is an enlarged detail view showing part of the front of the storage bay.

FIGS. 11-13 show a storage rack system in accordance with the invention for storing four pallets deep.

DETAILED DESCRIPTION OF THE PREFERRED EMBODIMENTS

Figure 2:
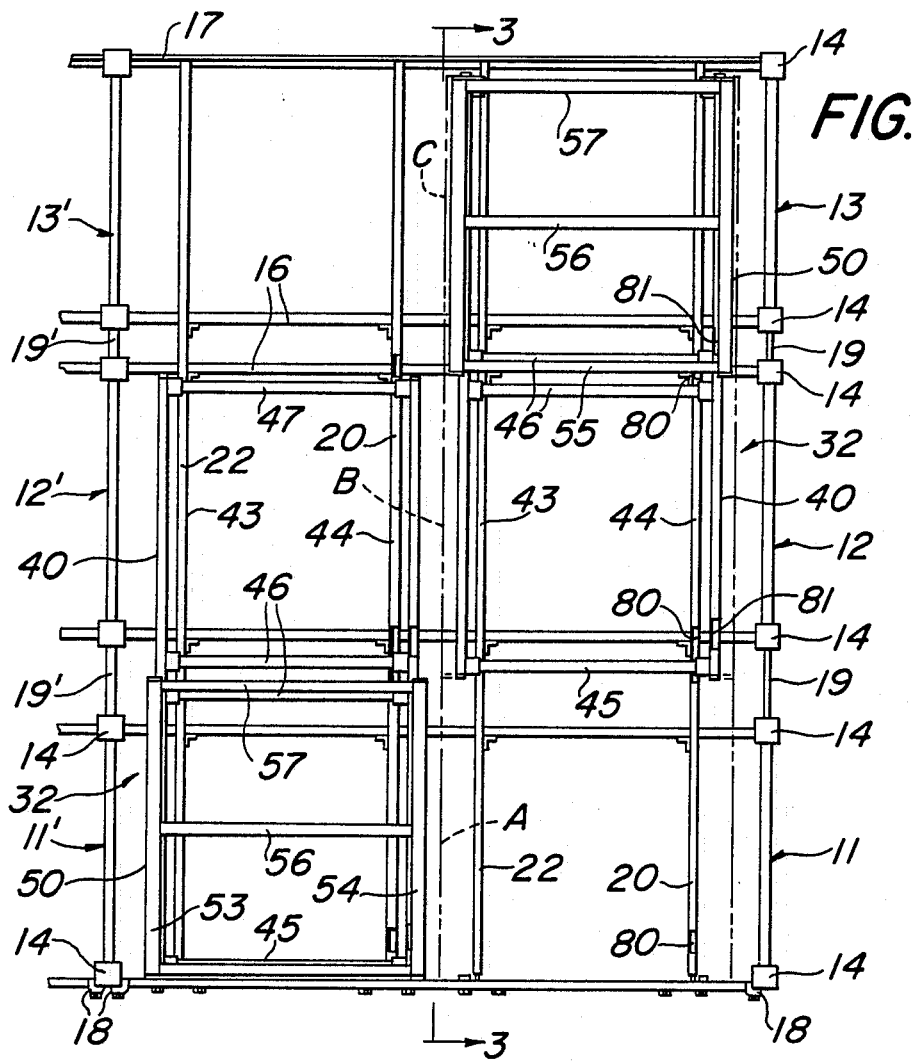
FIG. 2 is a plan view of part of a storage rack system shown in FIG. 1 with the pallet supporting cart assembly in a typical pallet storing position.

The storage rack system shown in FIG. 1 comprises a framework providing a plurality of storage bays each of which is defined by a plurality of vertical uprights and horizontal shelf beams constructed and arranged in a generally conventional arrangement, such as for example, the storage racks manufactured by Frazier Industrial Company. In FIG. 1, various parts of the framework and storage rack system have been omitted for the sake or clarity of illustration. FIG. 1 shows two storage bays in the lower corner of the storage rack system having their entry ends facing generally to the left of this figure. Each of these storage bays is constructed of a depth to provide storage for three pallets deep and of a width to accommodate two rows of pallets. To this end, there are provided three vertically extending upright frames indicated at 11, 12 and 13 (only the three frames on the right side of the storage bays being shown completely in FIG. 1). Each of the upright frames 11, 12 and 13 is comprised of a pair of upright columns 14 joined by horizontally extending ties and crossbrace members. This frame structure is conventional in the art and is employed in the storage racks of Frazier Industrial Company. Each of the right side upright frames 11, 12 and 13 is connected with a corresponding upright frame 11', 12' and 13', respectively, on the left side of the storage bays by means of a plurality of horizontally extending shelf beams, including a front shelf beam 15, four interior shelf beams 16 and a rear shelf beam 17. Shelf beams 15, 16 and 17 are connected, by means of bolts and connectors, at their ends with aligned columns 14 of the upright frames 11, 12 and 13 and 11', 12' and 13'. This connection design is conventional, the connectors 18 for the front shelf beam 15 being shown in FIGS. 1, 3 and 6. This arrangement of the upright frames 11, 12 and 13 and 11', 12' and 13' and horizontal shelf beams 15-17 provides two important functions, namely, (1) to provide means for supporting the pallets containing the stored loads and (2) to support the track means and carts for positioning the pallet loads in the storage bays.

In accordance with conventional construction, each pair of adjacent upright frames 11, 12 and 13 are connected to each other by the use of a pair of back-to-back ties 19 shown in FIG. 1. The back-to-back ties 19 serve to keep the upright frames 11, 12 and 13 stabilized. It will be apparent that each storage bay is of a size to contain as many as six pallets, there being two rows of pallets three deep. In FIG. 1 there is shown in dashed lines the general position of a row of three pallet loads indicated at A, B and C.

Figure 4:
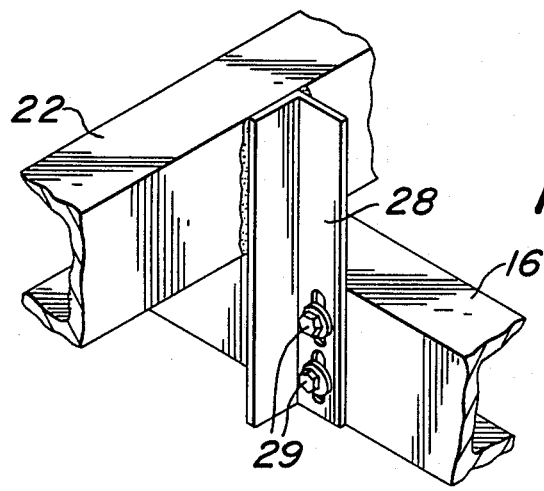
FIG. 4 is a detail view showing the support for the track means.
Figure 7:
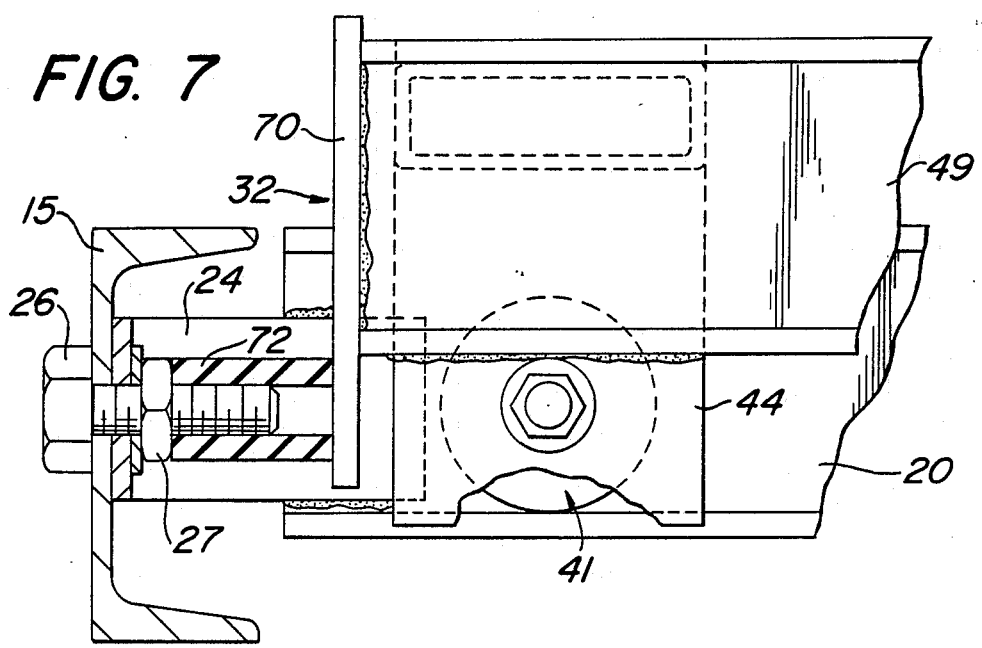
FIG. 7 is a detail view showing the bumper arrangement employed in the storage rack system in accordance with the invention.

For each row of stored pallets, there is provided a pair of associated track means 20 and 22 extending from the front to the back of the storage bay along the depth thereof. Each pair of associated track means 20 and 22 is spaced apart across the width of the storage bay as is apparent from a consideration of FIGS. 1, 2 and 5. Each of the track means 20 and 22 is comprised of a structural channel member having a C-shaped cross-section. Each of the channel members of the track means 20 and 22 is supported on and secured to the shelf beams 15-17 in the arrangement shown in the drawings. More specifically, each of the channel members forming a track means 20 or 22 is bolted to a front shelf beam 15 in two locations, one on each side of the web of the C-shaped channel member by means of angle brackets 24. As shown in FIGS. 6 and 7, each angle bracket 24 has one leg welded to the web of the C-shaped channel member and the other leg bolted to the front shelf 15 by a bolt means including a bolt 26 and a nut 27. Thus, for each storage bay there are four C-shaped channel members bolted to the front shelf 15 to provide two pairs of associated track means 20 and 22. As best shown in FIGS. 3 and 4, the interior shelf beams 16 have the channel members forming the track means 20 and 22 supported thereon and secured thereto. To this end, each shelf beam 16 has an angle 28 welded to the web of a supported channel member 20 or 22 and bolted, by bolts 29, to the shelf beam 16 on which the channel member is supported. For each interior shelf beam 16, four channel members forming the two pairs of associated track means 20 and 22 are secured and supported thereby in the manner described above. The rear shelf beam 17 is mounted so the channel members forming the track means 20 and 22 run over the top thereof and are secured thereto by the use of a plate 30 that runs behind the C-shaped channel member and the rear shelf beam 17. Plate 30 is welded to the C-shaped channel member and is fastened to the rear shelf beam 17 by the use of bolts 31. Each plate 30 closes the rear end of a channel member forming the track means 20 and 22 to provide a rear stop for the wheels of the carts riding thereon as will be described hereafter.

Each pair of associated track means 20 and 22 is adapted to support a double cart assembly 32 for guiding the same for movement along the depth of the storage bay as will be described hereafter. Double cart assembly 32 comprises a large cart 40 mounted for movement along said track means 20 and 22 and a small cart 50 carried by and mounted for movement on large cart 40 between front and rear positions. Referring to FIG. 2, the forward position of the double cart assembly 32 and the front position of the small cart 50 are shown in the lefthand row of the storage bay shown in this figure, and the back position of double cart assembly 32 and the rear position of the small cart 50 is shown in the righthand row of this storage bay.

The large cart 40 includes a rectangular frame formed of six structural members welded together as shown in the Drawings. There are provided a pair of side structural angles 43 and 44, a front structural tube 45, a pair of middle structural tubes 46 and a rear structural tube 47 extending between the side angles 43 and 44. The side angles 43 and 44 run along the depth of the storage system, are typically about ninety-six inches in length, and are adapted to support two pallet loads, as indicated by pallet loads B and C in an arrangement as best shown in FIG. 3. There are provided four bearing-type wheel assemblies 41 (shown in detail in FIG. 8) mounted on each side angle 43 and 44 to provide eight rolling supports for the large cart 40. As is best shown in FIG. 5, the large cart wheel assemblies 41 ride on the tapered bottom flange portion of the C-shaped channels forming the track means 20 and 22.

It will be apparent that the above-described instruction provides an arrangement whereby the four wheel assemblies 41 on one side of a large cart 40 are guided by one track means 20 and the four wheel assemblies on the other side of the large cart are guided by a second track means 22 as the large cart 40 moves along the depth of the storage bay between the forward and back positions of the double back assembly. It will be apparent that by utilizing wheel assemblies 41 as shown in detail in FIG. 8 and as described in my copending application, the large cart 40 is constructed and arranged to ride on track means 20 and 22 supporting the same so that there is good contact between the wheel rollers and the track portion on which they are supported.

The large cart 40 is provided with a pair of track members 48 and 49, each mounted on one side of the large cart frame for carrying and mounting the small cart for movement on the large cart between its front and rear positions. Each said large cart track members 48, 49 is comprised of a C-shaped channel secured on the vertical leg of the side angles 43 and 44 of the large cart as is best shown in FIG. 5. The track members 48 and 49 extend throughout the two pallet length of the large cart 40 so as to permit the small cart 50 to move between its front and rear positions as will be described hereafter.

Figure 8:
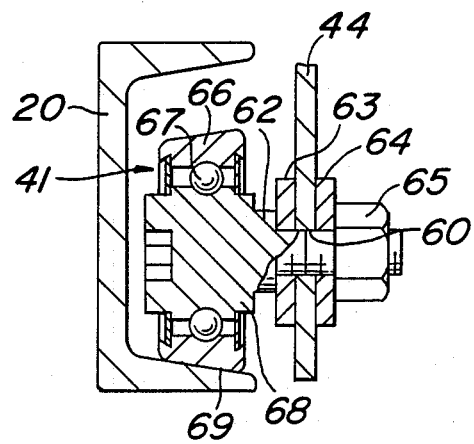
FIG. 8 is a detail, view showing the wheel assembly employed in the carts used in the storage rack system in accordance with the invention.
Figure 9:
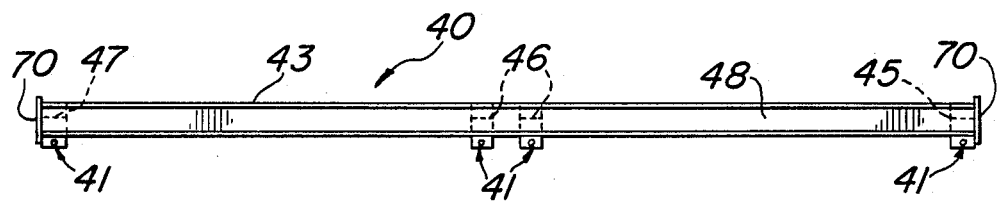
FIGS. 9 and 10 are detail views showing the double cart construction, in-accordance with the invention.

The small cart 50 is manufactured as an independent unit and includes a rectangular frame providing support for a loaded pallet, a plurality of wheel assemblies 41 on each side of said frame, and means for supporting each of the wheel assemblies on the large cart track members 48, 49 as the small cart 50 moves along the depth of the storage bay between its front and rear positions. While the large cart 40 is of a length to span the depth of two pallet loads, the small cart is approximately one half the length of a large cart and it is constructed to span the depth of one pallet load. To this end, the small cart 50 is manufactured as an independent unit and includes a rectangular frame formed of five structural members welded together as shown in the Drawings. Thus, there are a pair of side angles 53 and 54, a front tube 55, a middle tube 56 and a rear tube 57. The side angles 53 and 54 which run along the depth of the storage system are typically forty-six inches long. A pair of bearing type wheel assemblies 41 are mounted on each side angle 53 and 54 to provide four rolling supports for the lower cart. The construction of each wheel assembly 41 will be described in detail hereafter and is shown in FIG. 8.

As is best shown in FIG. 5 the wheel assemblies 41 for the large cart 40 are mounted on vertically extending leg portions of the side angles thereof. The mounting means comprises horizontally extending holes 60 punched in the vertically extending legs with each hole 60 being used to mount a wheel assembly 41. Referring to FIG. 8, each of the wheel assemblies 41 has a horizontally extending axle 62 having a threaded reduced diameter portion extending on a horizontal axis through the hole 60 in the vertically extending side leg of the side members 43 and 44. The reduced diameter portion of axle 62 extends through a pair of round washers 63 and 64 on opposite sides of the vertically extending leg and is threaded to be engaged with a nut 65 in an arrangement whereby axle 62 is secured in place to extend on a horizontal axis. A wheel rim 66 is rotatably supported on the hub 68 of the axle 62 by means of a roller bearing means 67 positioned between hub 68 and wheel rim 66 by conventional sealed roller bearing construction known in the art. Wheel rim 66 is formed with a tapered outer or rolling surface 69, the taper angle on the rolling surface 69 of wheel rim 66 being the same as the taper angle formed on the bottom flange portion of the C-shaped channel members forming track means 20 and the C-shaped channel members forming the track members 48, 29 on the large cart 40.

The double cart assembly 32 is mounted into the pair of associated track means 20 and 22 by the use of three cutouts 80 formed in the upper flange of the C-shaped channel forming track means 22, said cutouts 80 being best shown in FIG. 2. These three cutouts are located to correspond with the wheel assembles 41 on the large cart 40. Actual field insertion is achieved by a procedure wherein the large cart 40 is tilted at an angle, the left side wheels are then slipped into the lefthand side track means 20 and the cart 40 is pulled towards the right so that the cart wheels can then be dropped through the track cutouts 80. This procedure locks the large cart 40 into position whereby double cart assembly 32 is guided for movement along the track means 20 and 22 as described above.

The upper small cart 50 is mounted into the track members 48 and 49 by a similar procedure to that described above with respect to the large cart 40. Thus, the C-shaped channels 49 are provided with a pair of cutouts 81 which are located in the upper flange thereof to correspond with the small cart's wheel assembly location. The small cart 50 is inserted by the same procedure as described above with respect to the large cart 40. Thus, the wheels of the small cart 50 are mounted into the lefthand track member 48 and the cart 50 is pulled toward the right and then the wheels on the righthand side of the cart 50 are dropped into the channel 49 through the pair of cutouts 81.

Large cart 40 has plates 70 welded thereto at each end to overlie the channels of each of the track members 48 and 49, respectively. Plates 70 serve as bumper plates for cart assembly 32 and as stop plates for the wheel assemblies 41 of small cart 50.

There are provided bumper means for holding the double cart assembly 32 in its forward position at the entry end of each storage bay. To this end, there is provided a bumper 72 for contacting bumper plates 70 on the large cart 40. Since each of these bumpers 72 is identical in construction, only one will be described in detail, with particular reference to FIG. 7. As shown in this Figure, each bumper 72 comprises a rubber stop member in the form of a hollow cylinder which is mounted on the rearwardly projecting end of the bolt 26. Bumpers 72 are arranged to contact the bumper plates 70 on the double cart assembly 32 at a predetermined position at the forward end of the storage bay so as to position the double cart assembly 32 in its forward position approximately immediately adjacent the front shelf 15 of the storage bay. The double cart assembly 32 will normally roll along the inclined track means 20 and 22 forwardly until they contact the bumpers 72 at this forward position and will then be stopped in this position. Each double cart assembly 32 is associated with two bumpers 72 for contacting each of the forwardly mounted bumper plates 70 thereon.

The small cart is held in position on the track members 48, 49 of the lower cart by closing the ends of the track members 48, 49 by means of plates 70 which contact the small cart wheel assemblies 41 to arrest the small cart in its front position.

The track means 20 and 22 are mounted on shelf beams 15–17 so that they extend with a slight inclination toward the entry end of a storage bay. The inclination is achieved by the accurate locating of the position of the supporting structure for the track means and typically is about ¼ inch for each 12 inches of length. It is noted that this inclination may not be apparent in the Drawings because of the small scale thereof. Also, the track members 48, 49 on the large cart 40 which support the small cart 50 are mounted to be parallel to the track means 20 and 22, wherefore the small cart 50 will also be supported with a slight inclination toward the entry end of the storage bay whereby the small cart 50 will be urged by gravity toward the front end of the large cart 40.

As is apparent from a consideration of the Drawings, the forward position of double cart assembly 32 is located at the entry end of the storage bay, the back position of double cart assembly 32 is located to span two and three pallets deep from the entry end of the storage bay, the front position of the small cart 50 overlies the forward half of the large cart 40, and the rear position of the small cart 50 overlies the back half of the large cart 40. Thus, each row of the storage bay can store three pallet loads A, B and C in an arrangement as best shown in FIG. 3. The front pallet supporting load A is supported on the track means 20 and 22, the middle pallet supporting load B is supported on the front half of the large cart 40 and the back pallet supporting load C is supported on the small cart 50.

The pallet loads A, B and C will be placed in the position shown in FIG. 3 by a conventional push-back loading technique employing conventional fork trucks as follows:

The fork truck carrying the pallet load supporting the first load to be stored (load C) will approach an empty storage rack from the aisle and move through the entry end of the storage bay to place the first load onto the empty small cart 50, which has assumed its position at the entry end of the storage bay as described above. The large cart 40 and small cart 50 will always be positioned in their forward position when empty by reason of the mounting of the track means 20 and 22 with a slight inclination towards the entry end of the storage bay. When it is desired to store the second pallet load (load B) in the storage bay the fork truck approaches the storage rack at an elevation such that said fork truck and the second pallet load B gently nudge the first load C toward the rear whereby said first load C and the small pallet 50 supporting the same will be pushed back rearwardly toward the rear of the storage rack up to the point where the fork truck can place the second load B onto the empty front half of the large cart 40. When it is desired to store a third pallet load (load A), the fork truck with said third pallet load A approaches the storage rack in the same elevation as with the previous load and the fork truck with the third pallet load A thereon gently nudges the first and second pallet loads B and C supported on the small and large carts 50 and 40, respectively, toward the rear of the storage rack until the fork truck can leave the third pallet load A on the track means 20 and 22 and the front shelf beam 14 at the front loading position at the entry end of the storage bay. In this manner, the row of the storage rack is fully loaded with three pallet loads A, B and C.

In order to unload the three pallet loads A, B and C, a procedure which is essentially the reverse of the above-described procedure is employed. As soon as the forward pallet load A is removed, the pallet loads B and C on the small cart 50 and the large cart 40 will roll forwardly to position the front half of the large cart 40 at the front (or pick) position. In a like manner, when pallet load B on the large cart 40 is unloaded, this will allow pallet load C on the small cart 50 to roll forwardly to the front (or pick) position where it can be subsequently unloaded by a fork truck as desired.

Figure 11:
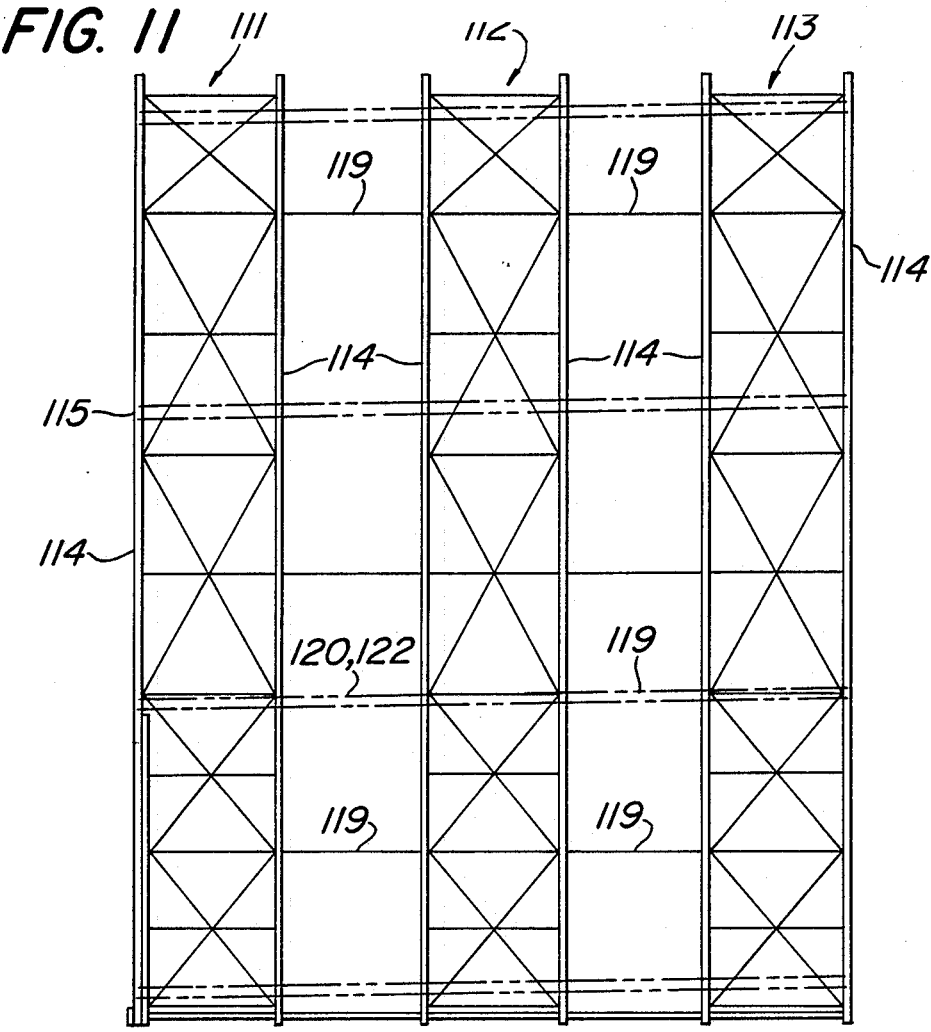
Figure 10:
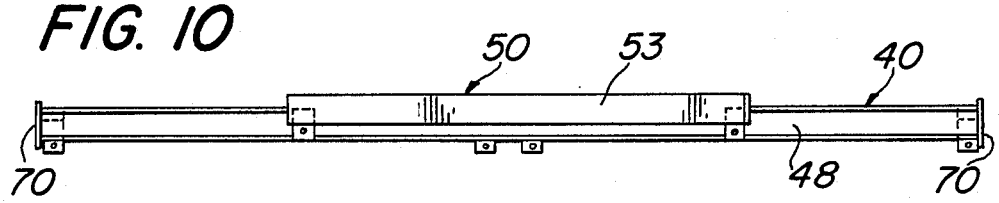

In FIGS. 11-13 there is shown a storage rack system for storing four pallets deep in each row. The storage rack system shown in FIGS. 11-13 comprises a framework which is essentially the same as that shown in FIG. 1, the main differences being that the spaces between adjacent upright frames are widened and the track means are lengthened to store four pallets deep in each row. Thus, the framework provides a plurality of storage bays each of which is defined by a plurality of vertical uprights and horizontal shelf beams constructed and arranged in a generally conventional arrangement such as the storage racks manufactured by Frazier Industrial Company. Each of these storage bays is constructed of a depth to provide storage for four pallets deep and of a width to accommodate two rows of pallets. There are provided three vertically extending upright frames indicated at 111, 112 and 113 essentially identical to the corresponding upright frames 11, 12 and 13 shown in FIG. 1. Each of the upright frames 111, 112 and 113 is comprised of a pair of upright columns 114 joined by horizontally extending ties and crossbrace members. Each of the upright frames 111, 112 and 113 shown in FIG. 10 is located on the right side of the storage bay and is connected with a corresponding upright frame on the left side of the storage bay by means of a plurality of horizontally extending shelf beams, including a front shelf beam 115, four interior shelf beams 116 and a rear shelf beam 117.

Shelf beams 115, 116 and 117 are connected, by means of bolts and connectors, at their ends with aligned columns 114 of the right side and left side upright frames 111, 112 and 113 in the same manner as described above with respect to the storage rack system shown in FIG. 1. Also, as discussed above with respect to FIG. 1, each pair of adjacent upright frames 111, 112 and 113 are connected to each other by the use of a pair of back-to-back ties 119 which serve to stabilize said frames. It will be apparent that each storage bay is of a size to contain as many as eight pallets, there being two rows of pallets four deep. In FIG. 12 there is shown the general position of a row of four pallet loads, indicated at A, B, C, and D.

For each row of stored pallets, there is provided a pair of associated track means 120 and 122 extending from the front to the back of the storage bay along the depth thereof. Each pair of associated track means 120 and 122 is spaced apart across the width of the storage bay in the manner described above with respect to the embodiment shown in FIG. 1. As best shown in FIG. 13, each of the track means 120 and 122 is comprised of a structural member having an I-shaped cross-section and is supported and secured to the shelf beams in a manner similar to the FIG. 1 embodiment. Each of the I-shaped members forming a track means 120 or 122 is bolted to a front shelf 115 at two locations as described above with respect to the FIG. 1 embodiment. Also, the rear shelf beam 117 is mounted so that the I-shaped members forming the track means 120 and 122 run over the top thereof and are secured thereto by the use of a plate that runs behind the associated I-shaped member and rear shelf beam 117 so as to provide a rear stop for the wheels of the carts riding thereon.

Each pair of associated track means 120 and 122 is adapted to support a lower cart 132 and an upper double cart assembly 32 and to guide said carts for movement along the depth of the storage bay in essentially the same manner as described above with respect to the embodiment shown in FIG. 1. Thus, each lower cart 132 and upper double cart assembly 32 is movable on a pair of associated track means 120 and 122 between a forward position and a back position, the forward position being located at the entrance end of the storage bay and the back position being shown in FIG. 12 wherein the parts are in the position for the storage of four pallets deep in a row of the storage bay.

The lower cart 132 is essentially identical to the lower carts described in my copending application and includes a rectangular frame formed of four structural angles welded together. There are provided a pair of side angles 133 and 134, a front angle 135, and a rear angle 136. A pair of bearing-type wheel assemblies 41 are mounted on each side angle 133 and 134 to provide four rolling supports for the lower cart 132. The construction of the wheel assemblies 41 has been described in detail above and is shown in FIG. 8.

The lower cart 132 is mounted into a pair of associated track means 120 and 122 by way of a pair of cutouts as was described above with respect to the embodiment shown in FIG. 1. In the installed position of the lower cart 132, the wheel assemblies 41 therefor ride on the tapered inwardly facing bottom flange portion of the I-shaped channel members forming track means 120 and 122 as is shown in FIG. 13.

As was discussed above and is apparent from a consideration of the Drawings, the forward positions of both lower cart 132 and upper double cart assembly 32 are located at the entry end of the storage bay, the back position of lower cart 132 is located two pallets deep from the entry end of the storage bay, the back position of the large cart 40 of the upper double cart assembly 32 is located to encompass three and four pallets deep from the entry end of the storage bay, and the rear position of the small cart 50 of the upper double cart assembly 32 is located four pallets deep from the entry end of the storage bay, said small cart 50 having a front position overlying the forward half of the large cart 40 and a rear position overlying the back half of the large cart 40. Thus, each row of the storage bay can store four pallet loads A, B, C, and D in an arrangement as shown in FIG. 12. The front pallet supporting load A is supported on track means 120 and 122, the forward middle pallet supporting load B is supported on the lower cart 132, the back middle pallet supporting load C is supported on the front half of the large cart 40, and the back pallet supporting load D is supported on the small cart 50.

The pallet loads A, B, C, and D are placed in position as shown in FIG. 12 by a push-back loading technique employing fork trucks of a type well known in the art. This technique is essentially the same as described above with respect to the embodiment shown in FIG. 1. Thus, the first load to be stored (pallet load D) is placed onto the empty small cart 50 which has assumed its position at the entry end of the storage bay as described above. When it is desired to store the second pallet load B in the storage bay, the fork truck approaches the storage rack at an elevation such that said fork truck and the second pallet load C gently nudge the first load D toward the rear whereby said first load D and the small pallet 50 supporting the same will be pushed back rearwardly toward the rear of the storage rack up to the point where the fork truck can place the second load C onto the empty front half of the large cart 40. When it is desired to store a third load (load B), the fork truck with said third load B approaches the storage rack and the pallet load B gently nudges the first two loads C and D toward the rear whereby the loads C and D (and the upper double cart assembly 32 supporting the same) are pushed back rearwardly toward the rear of the storage rack up to the point where the fork truck can place the load B on the empty lower cart 132. When the fourth pallet load A is to be stored, the fork truck with the pallet load A thereon gently nudges the other pallet loads B, C, and D supported on the carts 32 and 132 toward the rear of the storage rack until the fork truck can deposit the fourth pallet load A on the track means 120 and 122 and the front shelf beam 15 at the front loading position at the entry end of the storage bay. In this manner, the row of the storage rack is fully loaded with four pallet loads. In order to unload the four pallet loads, a procedure which is essentially the reverse of the above-described prcedures is employed.

What is claimed is:

1. In a storage rack system for storing pallet loads to a depth of three pallets deep having a framework providing a plurality of storage bays each of which is defined by a plurality of vertical uprights and horizontal shelf beams, each of said storage bays comprising a pair of track means extending from front to back along the depth of said storage bay and being spaced apart across the width of said storage bay, a double cart assembly movable along said track means between a forward position and a back position and including a large cart including a frame providing support for a pallet load, a track member mounted on each side of said large cart frame, a plurality of wheel assemblies on each side of said large cart frame, and means for supporting each of said large cart wheel assemblies to be guided by and make good rolling contact with said track means as said large cart moves along the depth of the storage bay, and a small cart carried by and mounted for movement on said large cart between front and rear positions, and including a frame providing support for a loaded pallet, a plurality of wheel assemblies on each side of said small cart frame, and means for supporting each of said small cart wheel assemblies on said large cart track members as said small cart moves along the depth of the storage bay between its front and rear positions, said large cart being of a length to span the depth of two pallet loads, and said small cart being approximately one half the length of said large cart and to span the depth of one pallet load, said forward position of said double cart assembly being located at the entry end of the storage bay, said back position of said double cart assembly being located to span two and three pallets deep from the entry end of the storage bay, said front position of said small cart overlying the forward half of said large cart, and said rear position of said small cart overlying the back half of said large cart, said pair of track means being mounted on said storage bay framework so as to be inclined toward the entry end of said storage bay and said track members being constructed and arranged so that said double cart assembly and said small cart are supported so that they tend to roll along said track means and said track members toward the entry end of said storage bay.

2. A storage rack system according to claim 1 wherein there are provided at least four wheel assemblies on each side of said large cart frame.

3. A storage rack system according to claim 1 wherein each of said track means comprises a C-shaped channel.

4. A storage rack system according to claim 3 wherein each of said large cart wheel assemblies comprises an axle, an annular wheel rim and a rolling bearing means rotatably mounting said wheel rim on said axle.

5. A storage rack system according to claim 4 wherein said means for supporting each of said large cart wheel assemblies on said large cart frame are constructed and arranged so that the rolling surface of said wheel rims are tapered inwardly.

6. A storage rack system according to claim 5 wherein each of said large cart wheel assemblies is mounted so that said axle extends on a horizontal axis, said wheel rims being tapered to provide a good rolling surface which extends at an angle to the axis of rotation thereof and approximating the inclined angle of lower flange portions of said channels.

7. A storage rack system according to claim 1 including bumper means associated with said large carts, said bumper means being mounted on the framework of said storage bay in a position to contact said large cart and limit the movement thereof toward the entry end of said storage bay at a location whereby said large cart is arrested in its forward position.

8. A storage rack system according to claim 1 wherein said large cart track members are C-shaped channels.

9. A storage rack system according to claim 3 wherein said large cart track members are C-shaped channels.

10. In a storage rack system for storing pallet loads to a depth of four pallets deep having a framework providing a plurality of storage bays each of which is defined by a plurality of vertical uprights and horizontal shelf beams, each of said storage bays comprising a pair of track means extending from front to back along the depth of said storage bay and being spaced apart across the width of said storage bay, a lower cart movable along said track means between a forward position and a back position and including a frame providing support for a loaded pallet, a pair of wheel assemblies on each side of said lower cart frame, and means for supporting each of said lower cart wheel assemblies so that the pair of lower cart wheel assemblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, and an upper double cart assembly movable along said track means between a forward position and back position and including a large cart having a frame of a length encompassing two loaded pallets, a plurality of wheel assemblies on each side of said large cart frame, and means for supporting each of said large cart wheel assemblies so that the plurality of large cart wheel assemblies on one side of said upper cart frame are guided by and make good rolling contact with a second guide means of said one track means as said large cart moves along the depth of the storage bay between a forward and back position and so that said plurality of large cart wheel assemblies on the other side of said upper cart frame are guided by and make good rolling contact with a second guide means of said other of said track means as said large cart moves along the depth of the storage bay between said forward and back positions thereof, said large cart having a track member extending along each side thereof throughout the length thereof, said upper double cart assembly also including a small cart having a frame providing support for a single loaded pallet, a pair of wheel assemblies on each side of said small cart frame, and means for supporting each of said small cart wheel assemblies on said track members of said large cart for movement between a front and rear position along said large cart, said forward positions of both said lower cart and said upper double cart assembly being located at the entry end of the storage bay, said back position of said lower cart being located two pallets deep from the entry end of the storage bay, said back position of said large cart of said upper double cart assembly being located to encompass three and four pallets deep from the entry end of the storage bay, and said rear position of said small cart of said upper double cart assembly being located four pallets deep from the entry end of the storage bay, said pair of track means being mounted on said storage bay framework so as to be inclined toward the entry end of said storage bay so that said lower cart and said upper double cart assembly are supported so that they tend to roll along said track means toward the entry end of said storage bay.

11. A storage rack system according to claim 10 wherein there are provided at least four wheel assemblies on each side of said large cart frame.

12. A storage rack system according to claim 10 wherein each of said track means comprises a channel means defining a first channel providing said first guide means arranged so that said first guide means of each track means face inwardly toward one another, and channel means defining a second channel providing said second guide means so that the second guide means of each track means face outwardly away from one another.

13. A storage rack system according to claim 12 wherein said channel means of each track means comprises a channel member having an I-shaped cross-section including a vertically extending web portion, a horizontally extending lower flange portion and a horizontally extending upper flange portion.

14. A storage rack system according to claim 13 wherein said large cart track members are C-shaped channels.

15. A storage rack system according to claim 10 wherein said large cart track members are C-shaped channels.

* * * * *